United States Patent
Shuart et al.

(10) Patent No.: US 8,186,920 B2
(45) Date of Patent: *May 29, 2012

(54) CLINCH ELEMENT AND METHOD AND APPARATUS FOR ATTACHING A CLINCH ELEMENT TO A PANEL

(75) Inventors: David M. Shuart, Summerville, SC (US); John M. Parker, Ann Arbor, MI (US); Robert G. Walker, II, Livonia, MI (US)

(73) Assignee: Whitesell International Corporation, Taylor, MI (US)

( * ) Notice: Subject to any disclaimer, the term of this patent is extended or adjusted under 35 U.S.C. 154(b) by 1121 days.

This patent is subject to a terminal disclaimer.

(21) Appl. No.: 12/041,980

(22) Filed: Mar. 4, 2008

(65) Prior Publication Data

US 2008/0148544 A1   Jun. 26, 2008

Related U.S. Application Data

(60) Continuation-in-part of application No. 11/498,390, filed on Aug. 3, 2006, now Pat. No. 7,698,799, which is a continuation-in-part of application No. 10/641,566, filed on Aug. 13, 2003, now Pat. No. 7,124,492, which is a continuation-in-part of application No. 10/245,938, filed on Sep. 18, 2002, now Pat. No. 6,647,608, which is a division of application No. 09/909,260, filed on Jul. 19, 2001, now Pat. No. 6,592,311.

(51) Int. Cl.
*F16B 37/06* (2006.01)
(52) U.S. Cl. ........................................ 411/181; 411/183
(58) Field of Classification Search .......... 411/179–181, 411/183, 188, 501, 533
See application file for complete search history.

(56) References Cited

U.S. PATENT DOCUMENTS

| | | | | |
|---|---|---|---|---|
| 203,815 | A * | 5/1878 | Bray | 411/501 |
| 559,276 | A * | 4/1896 | Fox | 411/501 |
| 1,332,686 | A * | 3/1920 | Reynolds | 285/202 |
| 3,809,139 | A * | 5/1974 | Strain | 411/183 |
| 4,018,257 | A * | 4/1977 | Jack | 411/181 |
| 4,221,041 | A * | 9/1980 | Hufnagl et al. | 29/512 |
| 4,790,703 | A * | 12/1988 | Wing | 411/260 |
| 4,911,592 | A * | 3/1990 | Muller | 411/181 |
| 4,915,558 | A * | 4/1990 | Muller | 411/179 |
| 7,374,382 | B2 * | 5/2008 | Bentrim | 411/180 |

* cited by examiner

*Primary Examiner* — Flemming Saether
(74) *Attorney, Agent, or Firm* — Dierker & Associates, P.C.

(57) ABSTRACT

A clinch element including a body portion having an annular lip portion projecting from an end face of the body portion including an arcuate free end and a frustoconical outer surface. One embodiment includes an annular lip projecting from both end faces of the body portion. A method of attaching the clinch element to one or two panels which includes driving the free end of the lip portion against an outwardly inclined frustoconical chamfered face of a die cavity, deforming the annular lip over the panel and a die member having a projecting piloting point and an annular die cavity surrounding the piloting point.

8 Claims, 6 Drawing Sheets

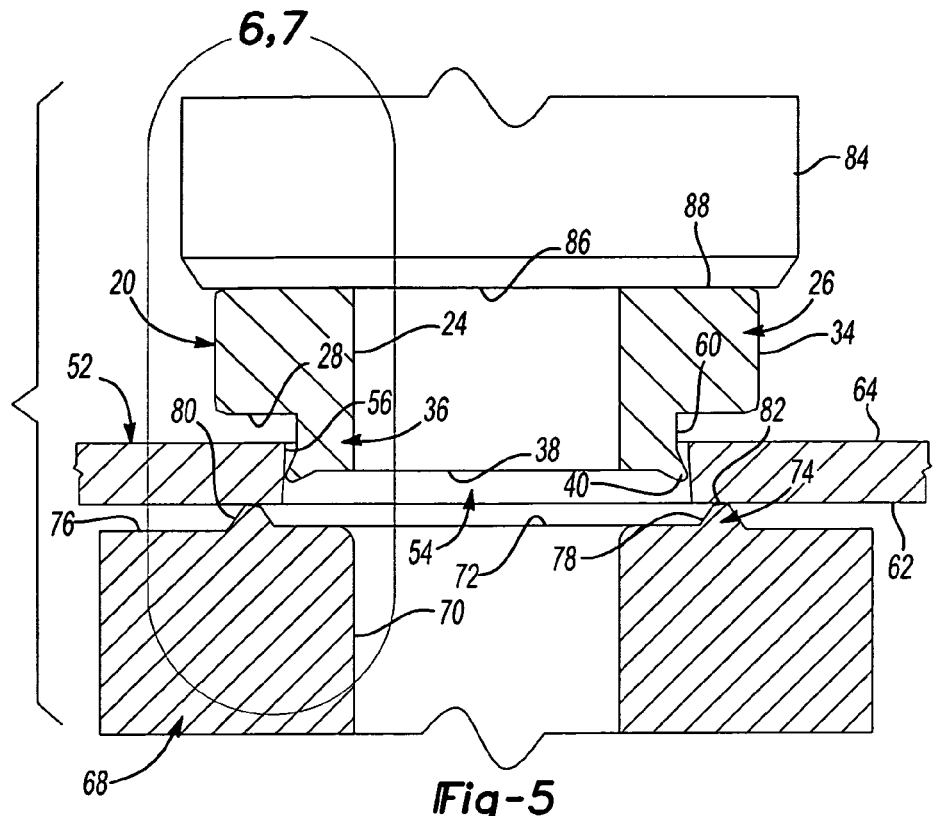
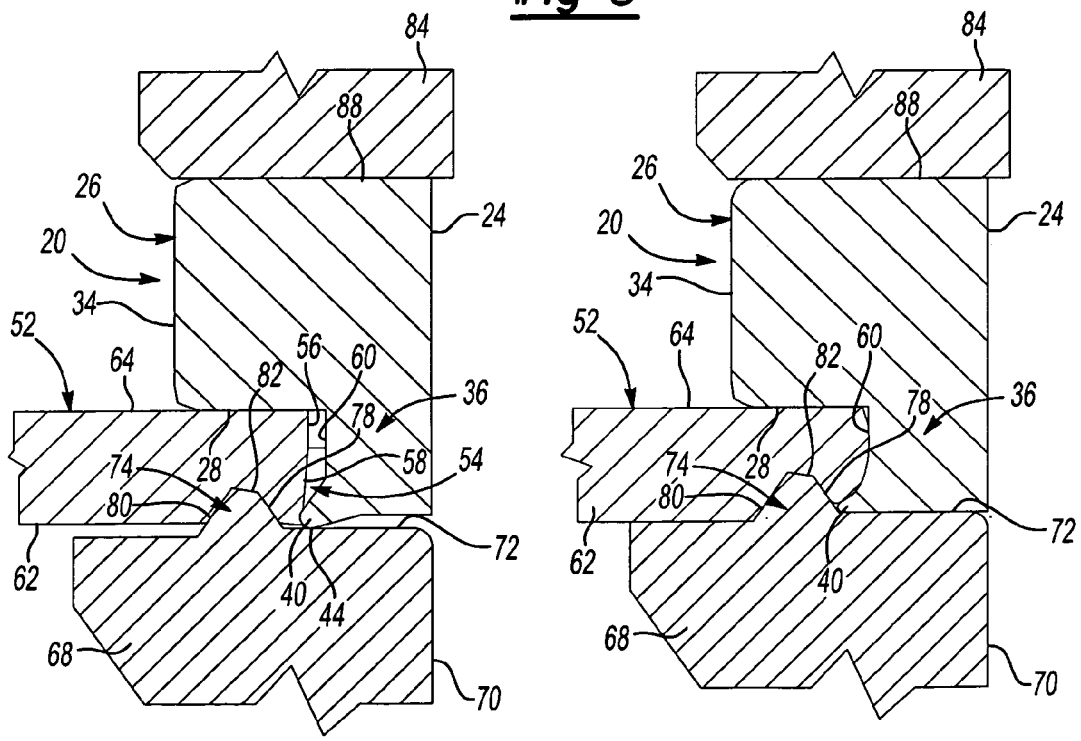
Fig-5
Fig-6
Fig-7

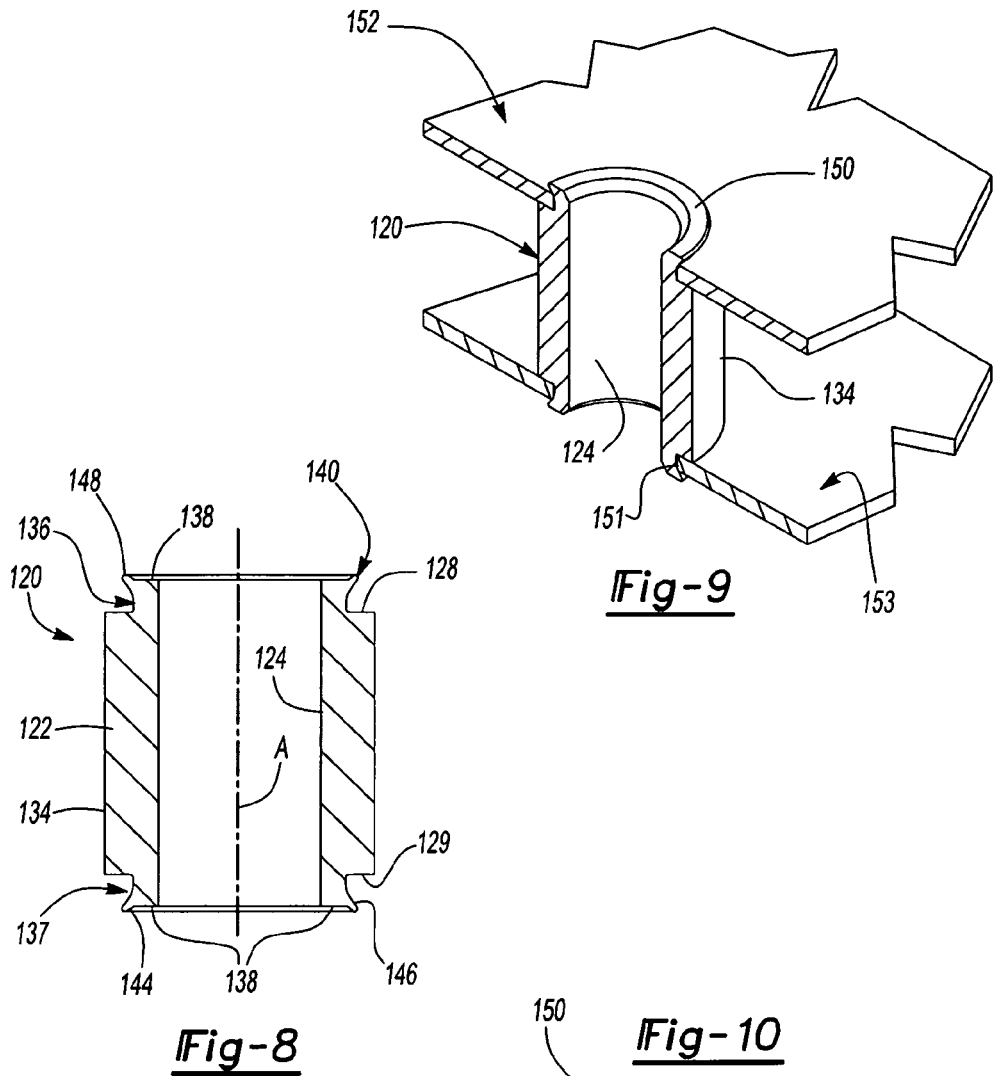
*Fig-9*
*Fig-8*
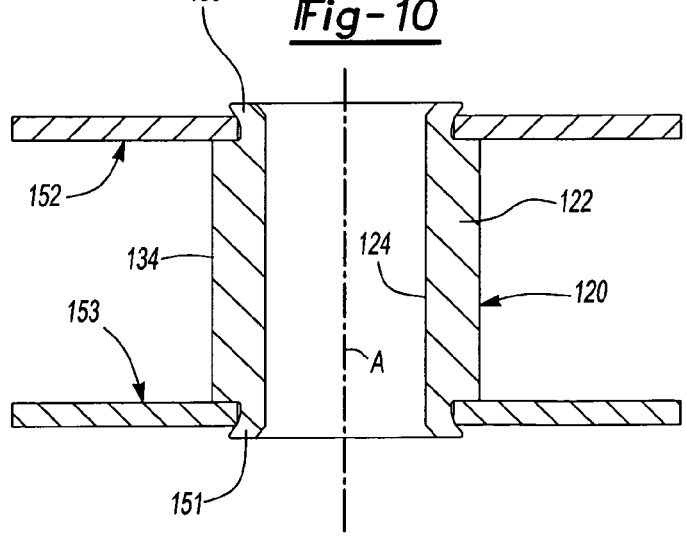
*Fig-10*

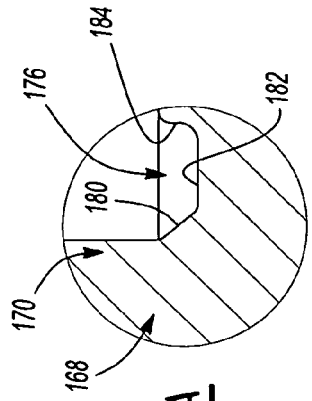
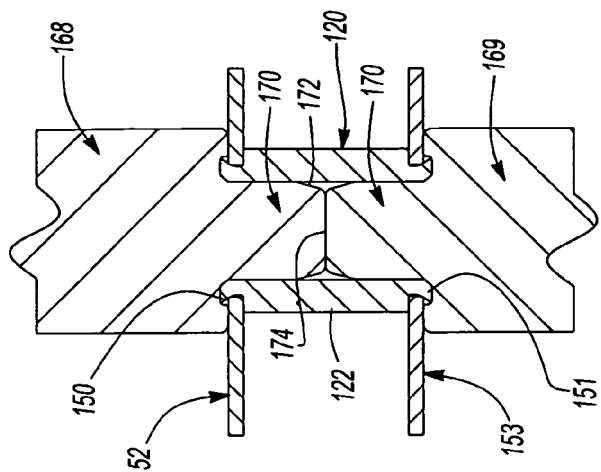
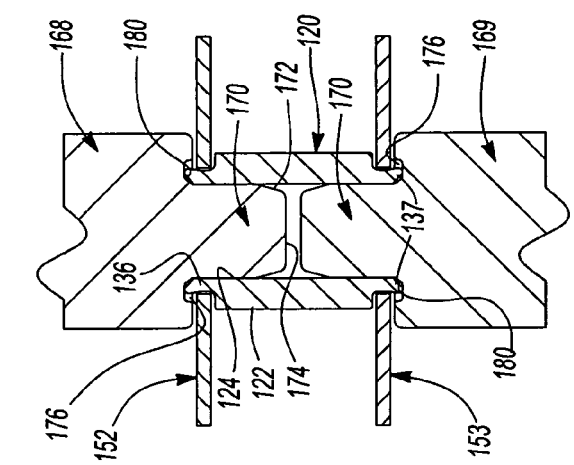
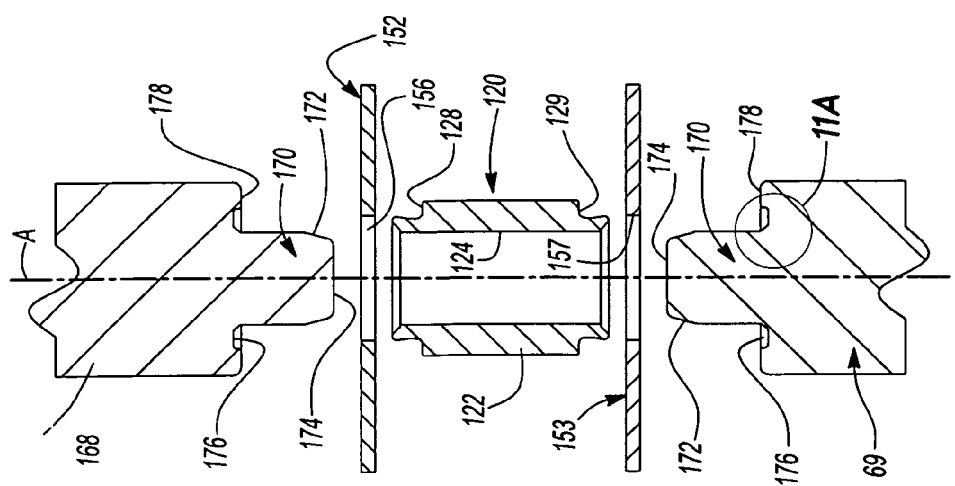

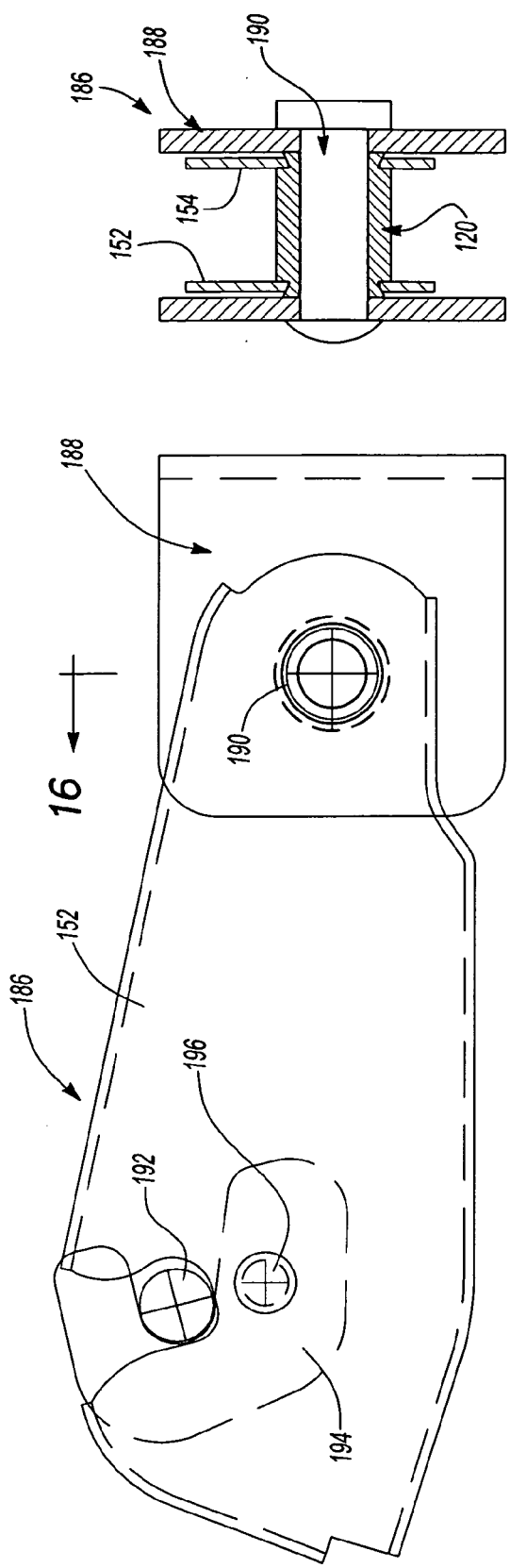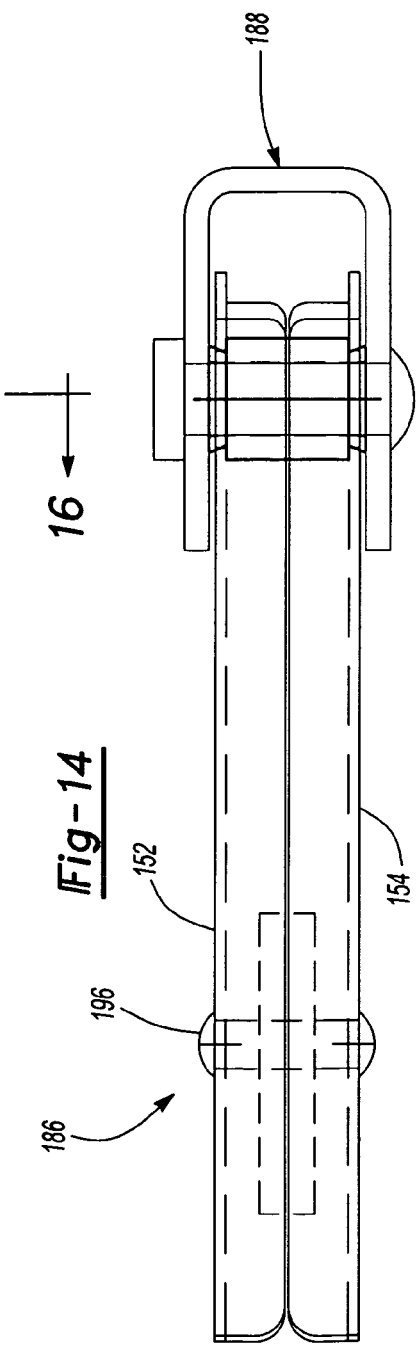

CLINCH ELEMENT AND METHOD AND APPARATUS FOR ATTACHING A CLINCH ELEMENT TO A PANEL

RELATED APPLICATIONS

This application is a continuation-in-part application of copending application Ser. No. 11/498,390 filed Aug. 3, 2006, which application was a continuation-in-part application of Ser. No. 10/641,566, filed Aug. 13, 2003, now U.S. Pat. No. 7,124,492, which application was a continuation-in-part application of Ser. No. 10/245,938, filed Sep. 18, 2002, now U.S. Pat. No. 6,647,608, which application was a divisional application of Ser. No. 09/909,260, filed Jul. 19, 2001, now U.S. Pat. No. 6,592,311.

FIELD OF THE INVENTION

This invention relates to self-clinching element and a method and apparatus for attaching a clinch element to a panel, particularly including metal panels. In one application, the clinch element includes an unthreaded bore which telescopically receives a pin or rod, allowing the panel to which the clinch spacer is attached to pivot relative to a bracket, panel or plate to which the rod is attached. As used herein, the term "clinch element" generally refers to a self-clinching element, spacer or bushing, wherein the clinch element is permanently and preferably rigidly attached to a panel or a panel at each end of the clinch element.

BACKGROUND OF THE INVENTION

Self-attaching fastener elements of the type disclosed in the above-referenced related parent applications are typically attached to a panel to attach a second element to the same panel. As used herein, the term "panel" may be any plate-like member, such as a metal panel, bracket, frame member or the like, as used, for example, by the automotive and appliance industries. The fastener may be a female fastener or a male fastener as disclosed in the above-referenced related applications. Following attachment of the fastener to the panel, the fastener is then utilized to attach a second element to the same panel. In mass production applications, self-attaching fasteners are typically installed in a panel in a die press, wherein the lower die member or die platen includes a die member or die button which supports the panel during installation and the upper die member or die platen includes a plunger which drives the fastener into the panel and the panel and/or the fastener is deformed to secure the fastener on the panel. Alternatively, the self-attaching fastener may be installed in a conventional press having opposed relatively moveable die members.

However, as discussed further below, the self-clinching element or clinch element of this invention has been designed for different applications than the fastener systems disclosed in the above referenced applications, but which still requires a very secure and preferably rigid interconnection between the clinch element and the panel or panels and a substantial pull-off or pull-out strength.

SUMMARY OF THE INVENTION

As briefly set forth above, the clinch element, method of attachment and installation apparatus of this invention was designed for particular applications, wherein the clinch element is permanently attached to a panel or panels, preferably metal panels, is self-clinching in a press, for example, to form a rigid and secure assembly, wherein in one embodiment of the intended application, the clinch element includes a smooth unthreaded bore to receive a pivot rod as described above. In one application of this invention, for example, the clinch element or a plurality of clinch elements are permanently and rigidly attached to a metal plate or panel which is a component of an automotive seat assembly which pivots relative to a support, such as a bracket, and wherein the support includes a rod or a plurality of metal rods telescopically received in the bores of the clinch elements or bushings, pivotally guiding the movement of the seat component, such as a latch assembly. As will be understood by those skilled in this art, the clinch element must therefore be rigidly attached to the metal plate or plates and have excellent push-off strength. The clinch element and method of attaching a clinch element of this invention achieves these objectives and may be easily and conveniently permanently attached to a panel in a conventional press as disclosed, for example, in the above-referenced related applications and patents.

In one embodiment of the method of attaching a clinch element or bushing to a panel, preferably a metal panel, of this invention includes the following steps. Forming a clinch element, including a body portion preferably having an axial bore, an annular flange or body portion extending radially surrounding the bore preferably having a generally planar annular face and an annular barrel or lip portion integral and coaxially aligned with the annular body or flange portion surrounding the bore having a diameter less than the annular flange or body portion. The annular lip or barrel portion includes an end face having an outer annular lip portion extending an angle radially outwardly and axially from the end face of the barrel portion. In one preferred embodiment, the end face of the barrel portion surrounding the bore is planar and extends generally perpendicular to an axis of the bore, such that the outer annular lip portion extends at an angle radially outwardly and axially from the planar end face and surrounds the bore. In another embodiment, as described below, the body portion includes an annular lip or barrel portion integral with and projecting from each end face, such that the clinch element may be attached to two spaced panels and used as a bushing or spacer.

One embodiment of the method of this invention further includes forming an opening in a panel having an internal diameter greater than an outer diameter of the outer annular lip portion, but less than an outer diameter of the annular flange or body portion and wherein the panel has a thickness less than a distance between the annular end face of the body portion and an axial extent of the outer annular lip of the barrel portion, such that the annular outer lip of the barrel portion can be deformed over a face of the panel to secure the clinch element to the panel as further described below. In one embodiment, the opening through the panel includes a cylindrical portion having an internal diameter slightly greater than an outer diameter of the outer annular lip of the barrel portion, which receives the lip portion during installation, and a frustoconical portion extending from the cylindrical portion.

The method of this invention further includes inserting the annular lip and barrel portion through the opening in the panel for receiving a face of the panel on the annular end face of the annular flange portion. As set forth above, the opening through the panel preferably has an inside diameter greater than an outside diameter of the lip and barrel portion, such that the opening is spaced from the outer surface of the barrel portion. One embodiment of the method of this invention then includes deforming the outer annular lip of the annular barrel portion radially outwardly and axially against an opposed face of the panel and driving a die member having an annular projecting generally V-shaped lip against the opposed face of the panel, simultaneously deforming the panel radially inwardly, driving the inner surface of the panel opening against the outer surface of the annular barrel portion and beneath the annular lip of the annular barrel portion, permanently and rigidly attaching the clinch spacer to the panel.

In one embodiment of the method of this invention, the opposed or first face of the panel is first supported on an end face of the die member or die button in a press, for example, and more specifically the first face of the panel is supported on the annular projecting generally V-shaped lip of the die button prior to installation of the clinch spacer to the panel. As set forth in the above-referenced related applications and patents and as will be understood by those skilled in this art, the die button may be supported in one die member or die platen of a press and the clinch element may be installed by an installation head located in the opposed die member or die platen, such that upon closing of the press, the barrel portion of the clinch element is driven through the panel opening. For example, in a typical application, the die button may be installed in the lower die member or die platen of a press and the installation head may be installed in the upper die member or die platen. The installation head includes a reciprocating plunger which drives the lip portion of the clinch spacer through the panel opening and the generally planar annular face of the flange portion against a second face of the panel, thereby driving the first face of the panel against the annular projecting generally V-shaped lip, driving the annular projecting generally V-shaped lip of the die button into the first face of the panel and deforming the panel radially inwardly as described above. In one embodiment of the die button, the die button includes annular planar face surrounding a central bore surrounded by the projecting generally V-shaped lip, opposite the outer annular lip of the barrel portion which deforms the annular lip of the barrel portion radially outwardly and axially against the first face of the panel, permanently and rigidly attaching the clinch element to the panel as described above.

In one embodiment of the clinch element or spacer of this invention, the outer annular lip extending from the end face of the annular barrel portion includes an upper face which is inclined outwardly and axially from the end face, and the method then includes driving the generally planar end face of the die member against the upper face of the annular lip, deforming the outer annular lip radially and substantially flush with the end face of the barrel portion. In the disclosed embodiment, the outer annular lip of the barrel portion further includes an outer face inclined toward the upper face and the end of the outer annular lip is arcuate, wherein the method includes driving the outer face of the annular lip radially outwardly and axially as set forth above against the second face of the panel during radial inward deformation of the panel against the outer surface of the barrel portion as set forth above.

Further, in one embodiment, the annular projecting generally V-shaped lip of the die button includes an outer face inclined inwardly from the annular end face of the die button and an inner face is inclined outwardly from the end face toward the outer face, and the method then includes driving the annular projecting generally V-shaped lip of the die button against the first face of the panel adjacent the opening through the panel. In one more embodiment, the outer face of the projecting generally V-shaped annular lip of the die button defines a greater angle relative to the end face of the die button than the inner face, such that the method includes driving the annular projecting lip of the die button against the first face of the panel, wherein the inclined outer face of the projecting generally V-shaped lip further deforms the panel radially inwardly as described above. In the disclosed and one preferred embodiment, the annular projecting generally V-shaped lip of the die button further includes a planar end face inclined inwardly from the outer face to the inner face, wherein the method then includes driving the inwardly inclined end face of the projecting V-shaped lip against the first face of the panel, further deforming the panel radially inwardly, forming a most secure clinch element and panel assembly.

In a further embodiment of the die member, the die member or die button includes a body portion having a projecting piloting point including a generally cylindrical outer surface having an outer diameter less than an inner diameter of the bore through the clinch element and an annular die cavity surrounding the projecting piloting point having an outwardly tapered frustoconical inner surface and a flat bottom wall extending generally perpendicular to the axis of the projecting piloting point. This embodiment of the die member eliminates the requirement for a projecting V-shaped lip as described above and better controls the installation of the clinch element. In this disclosed embodiment, the die member further includes a flat annular panel support surface surrounding the annular die cavity which extends perpendicular to the axis of the projecting piloting point. The free end of the projecting piloting point may also include a tapered end portion and includes a flat end in one preferred embodiment.

In this embodiment of the method of attaching a clinch element of this invention, the annular lip is received through an opening in a panel and the free end is driven against the outwardly tapered frustoconical inner surface of the die cavity, deforming the annular lip radially outwardly and against the flat bottom wall of the die cavity, permanently securing the clinch element to the panel. In the disclosed embodiment, the projecting annular lip of the clinch element is received through the opening formed in the panel and the projecting piloting point of the die member is received through the axial portion of the clinch element. In the disclosed embodiment, the panel is received on the annular surface surrounding the annular die cavity and the annular lip is then driven against the outwardly tapered frustoconical inner surface of the die cavity as described above. The projecting piloting point thus guides the installation of the clinch element in a panel.

In another disclosed embodiment, the clinch element includes two projecting annular lip portions, including a first annular lip portion integral with and projecting from one end face of the body portion surrounding the bore and a second lip portion integral with and projecting from a second end face of the body portion surrounding the bore. This embodiment of the clinch element of this invention may be used for retaining two panels in parallel relation, for example. One application for this embodiment of the clinch element is a latch mechanism such as used by the automotive industry to latch and lock the third row seat of a van. The method of installation of the double ended clinch element includes forming a first opening in a first panel having an inner diameter greater than the outer diameter of the first projecting lip portion, but less than the diameter of the body portion of the clinch fastener; forming a second opening in a second panel having an inside diameter or inner diameter greater than the outer diameter of the second projecting lip portion, but less than the outer diameter of the body portion; then inserting the first annular projecting lip portion through the first panel opening; inserting the second projecting annular lip through the second opening in the second panel; then driving the free end of the first projecting lip against the outwardly tapered frustoconical inner surface of the die cavity securing the first annular lip to the first panel;

then driving the second annular lip portion against the frustoconical inner surface of the die cavity of the same or a second die member, securing the second annular lip to a second panel. Where the die member includes a projecting piloting point as described above, the method of this invention further includes receiving the projecting piloting point into the bore of the clinch element, then driving the annular projecting lip of the clinch element against the outwardly tapered frustoconical inner surface of the die cavity. As will be understood by those skilled in this art, the terms "driving" and "inserting" are relative terms and include driving the die member relative to the clinch element or vice versa and moving the panel relative to the clinch element to insert the annular lip portion through the panel opening. Further, the terms clinch "spacer," clinch "element" and clinch "bushing" are arbitrary terms and are not meant to limit the scope of this invention.

As will be understood by those skilled in this art, various modifications may be made to the clinch element and method apparatus for attaching a clinch element of this invention within the purview of the appended claims. The following description of the preferred drawings and the embodiments shown in the attached drawings are for illustrative purposes only and thus do not limit the scope of this invention except as specifically set forth in the appended claims.

BRIEF DESCRIPTION OF THE DRAWINGS

FIG. 5 is a side cross-sectioned view of the clinch spacer, die member and panel aligned for assembly;

FIG. 6 illustrates the assembly during attachment similar to FIG. 5;

FIG. 7 is a side cross-sectional view of the final assembly;

FIG. 8 is a side cross-sectional view of an alternative embodiment of a clinch element or bushing;

FIG. 9 is a side perspective view of the clinch element shown in FIG. 8 attached to a panel;

FIG. 10 is side cross-sectional view of the clinch element and panel assembly shown in FIG. 9;

FIG. 11 is an exploded side cross-sectional view of an installation assembly including die buttons for installing the clinch element shown in FIG. 8 in two panels;

FIG. 11A is an enlarged cross-sectional view of a portion of the die button shown in FIG. 11;

FIG. 12 is a side cross-sectional view similar to FIG. 11 during installation of the clinch element in the panel;

FIG. 13 is a side cross-sectional view similar to FIGS. 11 and 12 following installation of the clinch element in panels;

FIG. 14 is a top view of one potential commercial application of the clinch element and panel assembly shown in FIGS. 8 to 10 and 13;

FIG. 15 is a side view of the assembly shown in FIG. 14; and

FIG. 16 is a cross-sectional view of FIG. 14 in the direction of view arrows 16-16.

DESCRIPTION OF THE PREFERRED EMBODIMENTS

Figure 1:
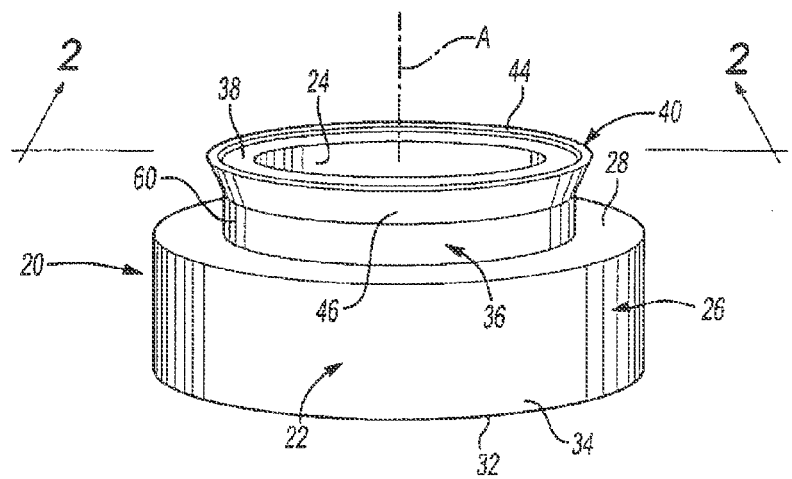
FIG. 1 is a side perspective view of one embodiment of a clinch spacer which may be utilized in the method of this invention.
Figure 2:
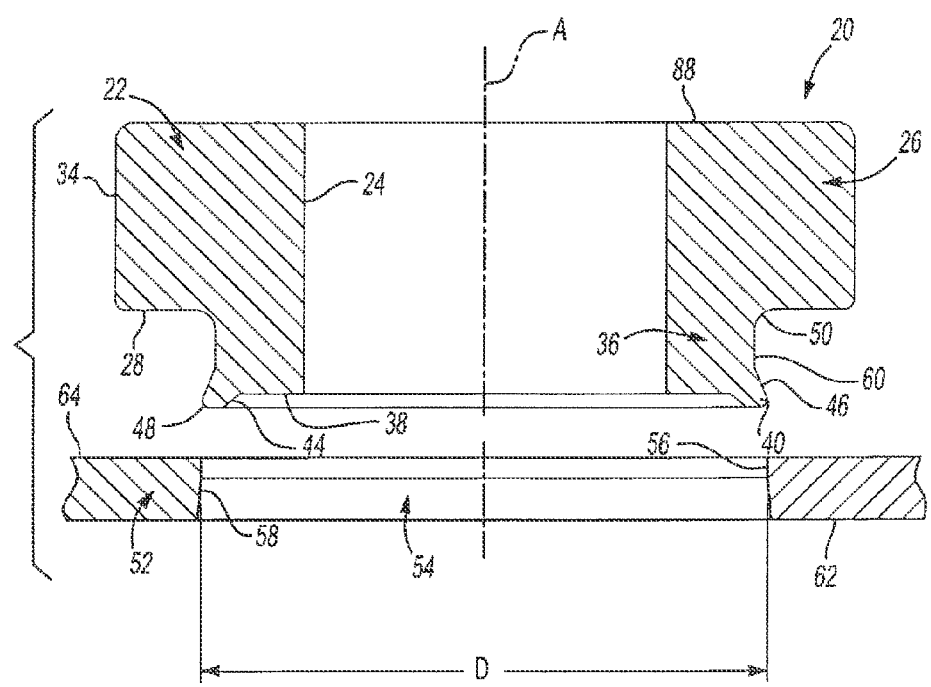
FIG. 2 is a side cross-sectional view of the clinch spacer illustrated in FIG. 1 opposite a panel prepared for attachment.

As best shown in FIGS. 1 and 2, one disclosed embodiment of the clinch element, bushing or spacer 20 includes a body portion 22 having an axial bore 24 which, in one embodiment is a smooth unthreaded cylindrical bore for an intended use or application, an annular flange portion 26 extending radially around the axial bore 24 having an annular end face 28 which, in the disclosed embodiment is planar and extends generally perpendicular to the axis "A" of the cylindrical bore 24. In this disclosed embodiment of the clinch element 20, the outer surface 34 of the annular flange portion 26 is cylindrical and coaxially aligned with the axis "A" of the cylindrical bore 24. However, the outer surface 34 of the annular flange portion 26 may be any convenient shape, including polygonal. The disclosed embodiment of the clinch element 20 further includes an annular barrel portion 36 integral with the annular flange portion 26 having a diameter less than the annular flange portion 26 surrounding the axial bore 24 including an end face 38 having an outer annular lip 40 which extends at an angle radially outwardly and axially from the end face 38. In the disclosed embodiment, the outer surface 60 of the annular barrel portion 36 is also cylindrical and coaxially aligned with the axis "A" of the axial bore 24 and the annular flange portion 26. As will be understood, the terms "barrel" and "lip" portions, "body" and "flange" portions are arbitrary terms and may also refer to the same elements or portions of the same elements of the clinch element.

As best shown in FIG. 2, the annular end face 38 of the annular barrel portion 36 is planar and extends perpendicular to the axis "A" of the cylindrical bore 24. Further, the outer annular lip 40 includes an "upper" face 44 inclined radially outwardly and axially which, in one preferred embodiment, is planar. In the disclosed embodiment, the upper face 44 is planar and, in the disclosed embodiment, the upper face 44 of the inclined annular lip 40 of the barrel potion 36 is inclined relative to the end face 38 at an angle of about 30 degrees, or preferably between 20 and 40 degrees. As used herein, the term "upper" referring to the upper face 44 is arbitrary and, as described below, during installation is actually a lower face if the clinch spacer 20 is installed downwardly as disclosed below. The outer annular lip 40 further includes an outer face 46 inclined radially outwardly and axially from the outer surface 60 of the barrel portion 36 which, in the disclosed embodiment, is also planar and angled toward the upper face 44 of the outer annular lip 40 and the free end 48 of the outer annular lip 40 is arcuate, blending into the upper and outer faces 44 and 46, respectively. In the disclosed embodiment of the clinch spacer 20, the outer surface 60 of the barrel portion 36 blends into the annular end face 28 of the flange portion 26 in an arcuate surface 50. As set forth above, the described elements of the clinch spacer may be modified within the purview of the appended claims.

One embodiment of this invention relates to a method of attaching a clinch element 20 to a panel 52 as disclosed, for example, in FIG. 2. In this embodiment of the method of this invention, an opening 54 is preformed, pierced or prepunched through the panel 52 and the clinch element 20 is clinched and permanently attached to the panel 52. In the disclosed embodiment, the panel opening 54 includes a cylindrical opening 56 which receives the barrel portion 36 of the clinch spacer 20 and a frustoconical opening 58 opposite the cylindrical opening 56. In one embodiment, the cylindrical opening 56 has a diameter "D" substantially equal to but slightly greater than the outer diameter of the outer annular lip 40 and more substantially greater than the outer diameter of the outer surface 60 of the annular barrel portion 36, which in the disclosed embodiment, is cylindrical. As described below, a first face 62 of the panel 52 is first received on the annular projecting lip 74 of a die member or die button 68 disclosed below and a second face 64 of the panel 52 receives the annular barrel portion 36 of the clinch spacer 20. As will be understood, the terms "first" and "second" faces are arbitrary and used for ease of description only.

Figure 3:
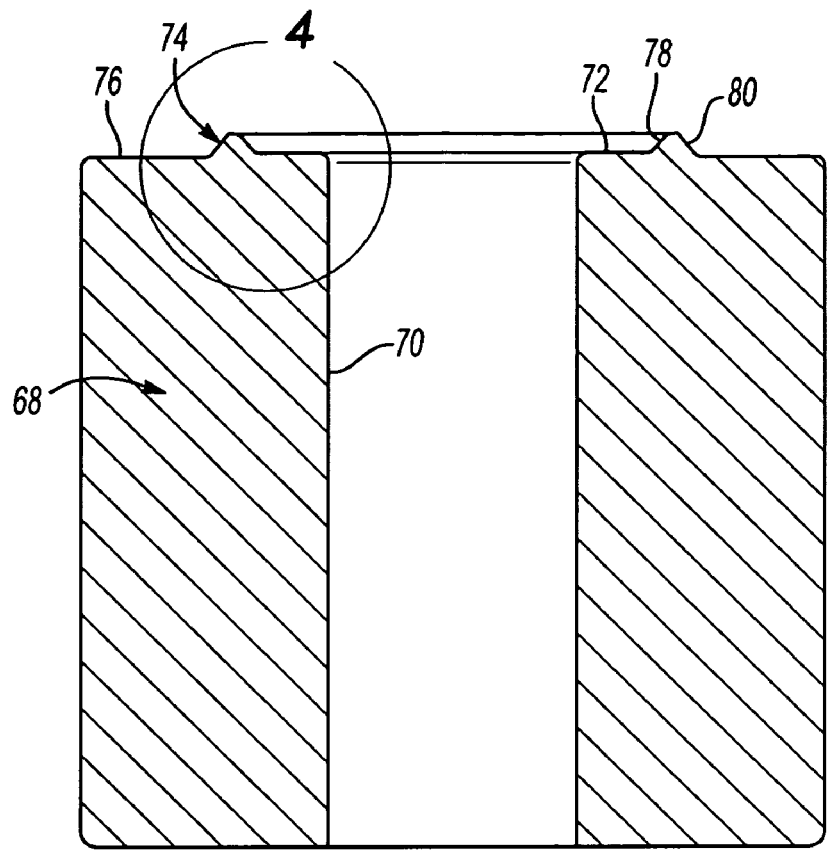
FIG. 3 is a side cross-section of one embodiment of a die member which may be utilized in the method of this invention.
Figure 4:
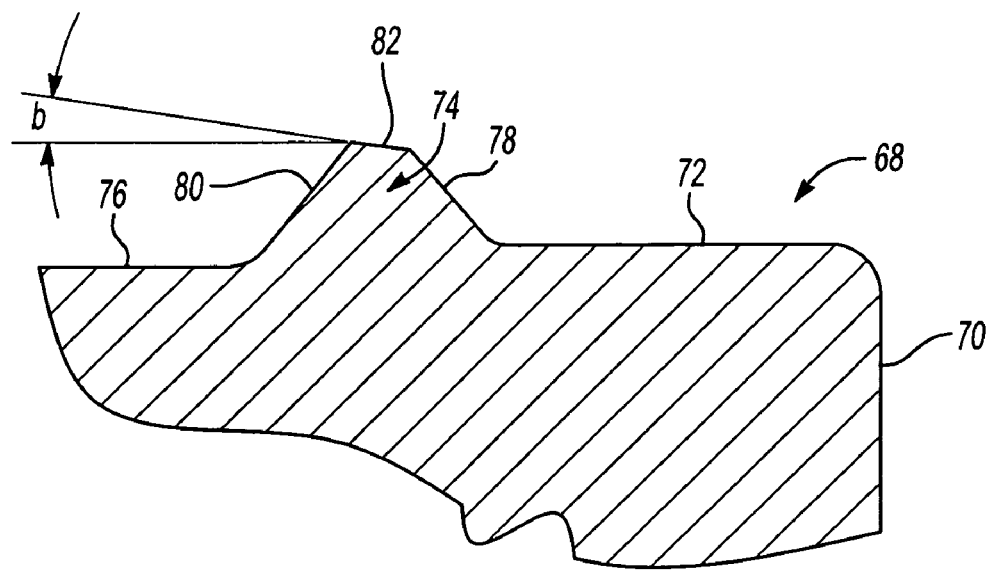
FIG. 4 is an enlarged side cross-sectional view of the end of the die button illustrated in FIG. 3.

One embodiment of a die button 68 which may be utilized in one embodiment of the method of this invention to form a clinch element and panel assembly is shown in FIGS. 3 and 4. In this embodiment, the die button 68 includes an axial bore 70 which, as described below, is coaxially aligned with the axial bore 24 though the clinch spacer 20 and the panel opening 54 during installation. In one disclosed embodiment, the die button 68 includes a first planar annular end face 72 surrounding the axial bore 70, an annular projecting generally V-shaped lip 74 surrounding the first end face 72 and a second end face 76 surrounding the annular projecting lip 74. The first annular end face 72 is preferably planar and the annular projecting lip 74 is preferably generally V-shaped as best shown in FIG. 4. In one disclosed embodiment of the die button 68, the annular projecting lip 74 includes an inner face 78 which, in one embodiment, is planar and inclined radially inwardly toward the bore 70 and an outer face 80 which is inclined radially outwardly toward the outer face 76 and may also be planar as best shown in FIG. 4, forming a generally V-shape. Further, in this disclosed embodiment, the annular lip includes an inclined planar end face 82 which, as best shown in FIG. 4, is inclined at an angle "b" radially inwardly toward the bore 70 to deform the panel 52 radially inwardly. Angle "b" is preferably between 5 and 15 degrees or more preferably about 10 degrees. Further, as best shown in FIG. 4, the angle between the second end face 76 of the die button 68 and the inner face 78 is greater than the angle between the first end face 72 and the outer face 80 by about 5 degrees or greater to further deform the panel radially inwardly as described below.

As best shown in FIGS. 5 to 7, one embodiment of the method of this invention first includes aligning the clinch spacer 20 with the annular barrel portion 36 opposite and coaxially aligned with the opening 56 through the panel 52. In a typical application, the die button 68 will be fixed in the lower die member or die platen of a press (not shown) with the panel 52 supported and clamped on the die button 68 and the bore 70 through the die button coaxially aligned with the opening 54 through the panel 52. The clinch elements 20 may be fed to an installation head (not shown) in an upper die member or die platen (not shown) which includes a reciprocating plunger 84. In the disclosed embodiment, the plunger 84 includes a planar end face 86 and the clinch element 20 includes an end or back face 88. During installation, the planar end face 86 of the plunger 84 is driven against a back face 88 of the clinch spacer 20, driving the annular barrel portion 36 of the clinch spacer 20 through the opening 54 in the panel 52 and the annular end face 28 of the annular flange portion 26 against the second face 64 of the panel 52. As described above, the first face 62 of the panel 52 is supported on the annular projecting lip 74 of the die button 68 as best shown in FIG. 5. As will be understood by those skilled in this art from the above description and FIGS. 5 to 7, as the reciprocating plunger 84 is driven against the back face 88 of the clinch spacer 20, the generally V-shaped annular projecting lip 74 of the die member 68 is driven into the first face 62 of the panel as shown in FIG. 6, deforming the panel 52 radially inwardly and the first or inner end face 72 of the die button 68 is then substantially simultaneously driven against the upper face 44 of the outer annular lip 40 of the annular barrel portion 36 deforming the annular lip 40 of the barrel portion 36 radially outwardly and axially against the first face 62 of the panel 52; that is, toward the annular end face 26 of the annular flange portion 36.

Finally, as best shown in FIG. 7, when the plunger 84 "bottoms" against the die button 68, the generally V-shaped annular projecting lip 74 of the die button 68 is driven fully into the first face 62 of the panel 52 and the outer annular lip 40 of the annular barrel portion 36 is deformed radially outwardly and against the first face 62 of the panel 52, forming a flush installation of the clinch spacer 20 in the panel 52. As set forth above, the end face 82 of the generally V-shaped annular projecting lip 74 may be inclined toward the bore 70 further assisting in the deformation of the panel 52 radially inwardly and against the cylindrical outer surface 60 of the annular barrel portion 36. The inward deformation of the panel 52 is also assisted by the fact that the inner face 78 is inclined at a greater or steeper angle than the outer face of the annular projecting lip 74 as shown in FIG. 4 and is longer than the outer face 80.

The alternative embodiment of the clinch element 120 shown in FIG. 8 and the subsequent figures may be substantially identical to the clinch spacer or element 20 described above, except that the clinch element 120 includes clinching lips on opposed ends of the body portion 122 as now described. As stated above, the clinching element 120 may be used for various applications including a spacer or a bushing as described below with respect to FIGS. 14 to 16. In this embodiment, the body portion 122 of the clinch element 120 includes an axial bore 124. The body portion 122 further includes a first annular end face 128 adjacent one end of the clinch element 120 and a second annular end face 129 adjacent the opposed end. In the disclosed embodiment of the clinch element 120, the outer surface 134 of the body portion 122 is cylindrical; however, as described above, the body portion 122 may be any convenient shape including polygonal. The body portion 122 further includes a first annular barrel portion 136 adjacent the first end of the body portion and a second annular barrel portion 137 adjacent the opposed or second end. As will now be understood, the clinch element 120 is numbered in the same sequence as the clinch element 20, except that the elements of the clinch element 120 are numbered in the 100 series and the annular barrel portion or lip 137 is an odd number.

Each of the first and second annular barrel portions 136 and 137, respectively, include a planar end face 138 surrounding the bore 124, a radially outwardly projecting lip portion 140 having an outwardly inclined frustoconical inner surface 144 and an outwardly inclined frustoconical outer surface 146 and an arcuate free end portion 148. Thus, as will be understood, the barrel or lip portions 136 and 137 may be identical to the barrel or lip portion 36 described above except that the clinch element 120 includes two clinching lips for attaching two panels 152 and 153 as shown in FIGS. 9 and 10. In this embodiment, the first and second annular end faces 128 and 129, respectively, are parallel and perpendicular to the axis A of the axial bore 124 and thus the panels 152 and 153 are secured in parallel relation as shown; however, the panel supporting annular end faces 128 and 129 of the body portion 122 could also be angularly related to secure the panels 152 and 153 in any angular relation. As shown in FIGS. 9 and 10, the annular barrel portions 136 and 137, including the radially outwardly projecting lip portions 140 have been deformed radially over the panels 152 and 153 forming clinched portions 150 and 151 as shown.

FIGS. 11 to 13 illustrate a method of attaching the clinch element 120 to the panels 152 and 153 as shown in FIG. 10. In the embodiment of the installation apparatus shown in FIG. 11, the clinch element 120 is aligned with openings 156 and 157 through panels 152 and 153 and die members 168 and 169 are aligned with the clinch element 120 and the die members 168 and 169 are aligned as shown and described below. As shown in FIGS. 11 and 11A, the die members 168 and 169 each include a projecting piloting point 170 which, in the disclosed embodiment, includes a leading tapered frustoconical end portion 172 and a flat end 174. The die members further include an annular die cavity 176 surrounding the piloting portion 170 and an annular panel support surface 178 surrounding the annular die cavity. As shown in FIG. 11A, the annular die cavity 176 includes a chamfered outwardly inclined frustoconical inner wall 180, a flat bottom wall 182 extending perpendicular to the longitudinal axis A of the projecting piloting point 170 and an outer wall 184 which may be any convenient shape because the outer wall 184 of the annular groove 176 does not engage the clinch element 120 or the panels 152 and 153 as described below. As shown in FIG. 11, the projecting piloting point 170 of the die members 168 and 169 are also aligned with the openings 156 and 157 through the panels 152 and 153 and the longitudinal axis A.

In a typical installation, the second die member 169 may be secured in the lower die shoe or die platen of a press (not shown) and the first die member 168 may be secured in the upper die shoe or die platen of a die press. The upper die shoe may further include an installation head (not shown) which receives the clinch element 120 and the first panel 152. The second panel 153 may be received over the projecting piloting point 170 of the second die member 169 in the lower die platen. The die members 168 and 169 are then moved relatively toward each other as shown in FIG. 12 to receive the annular barrel or lip portions 136 and 137 in the annular die cavities 176 as shown in FIG. 12. That is, the projecting piloting point 170 of the first die member 168 is received through the opening 156 of the first panel 152 into the annular bore 124 of the clinch element 120 and the projecting piloting point 170 of the second die member 169 is received through the opening 157 of the second panel 153 into the axial bore 124 as shown in FIG. 12. As will be understood, the outside diameter of the projecting piloting points 170 is generally equal to or slightly smaller than the internal diameter of the axial bore 124 through the clinch element 120 and the tapered end portion 172 of the piloting points guide the piloting points 170 into the axial bore 124 of the clinch element 120. The die members 168 and 169 may then be driven together in a die press in this example, driving the free end 148 (see FIG. 8) of the annular lip against the outwardly inclined frustoconical inner wall 180 (see FIG. 11A), clinching the ends of the annular barrel portions over the panels as shown at 150 and 151 in FIG. 13 and described above with regard to FIG. 10. In the disclosed embodiment, the flat ends 174 of the projecting piloting points 170 contact or "bottom-out" as shown in FIG. 13, limiting deformation of the clinched portions 150 and 151. As will be understood, various modifications may be made to the method of installation shown in FIGS. 11 to 13, including for example, side loading of the components of the installation.

FIGS. 14 to 16 illustrate one embodiment of a pivot joint and latch mechanism 186 which may be used for a vehicular third row seat interlock. The assembly includes U-shaped bracket 188 which may be welded or otherwise secured to the seat. The panels 152 and 153 form the latch mechanism and are pivotally supported by an orbital rivet 190 on the U-shaped bracket as shown in FIG. 16. As described above, the clinch element 120 is clinched or riveted to the panels 152 and 153, forming a spacer and bushing for this application. In this embodiment, a fixed pin 192 may be welded or otherwise secured to the floor pan (not shown) of the vehicle and a clevis 194 locks the panels or latch mechanism and is pivotally supported on a pivot pin or rivet 196. As will be understood, the interlock or latch mechanism 186 requires a very secure installation provided by the clinch element 120 of this invention. However, the clinch element, panel assembly and method of installing a clinch element in a panel or panels of this invention is not limited to any particular application, such as the automotive third row seat interlock 186 illustrated in FIGS. 14 to 16.

As will now be understood, the method of attaching a clinch element to a panel as illustrated, for example, in FIGS. 11 to 13, includes forming a clinch element 120 including a body portion 122 having an axial bore 124 therethrough and an annular lip portion comprising the barrel portion 136 and the radially outwardly projecting lip portion 140 integral with and projecting from an annular end face 128 of the body portion 122, wherein the lip portion includes the axial bore 124 and wherein the annular lip portion includes a free end portion 148 and preferably including a frustoconical inner surface 144. The method further includes forming a panel opening 156 through a panel 152 having a diameter less than an outside diameter of the end face of the body portion, but greater than the outer diameter of the outside surface 160 of the annular lip portion 140. The method then includes driving the annular lip portion against a bottom wall of an annular die cavity having an outwardly chamfered or frustoconical inner side wall 180, deforming the free end against the generally planar bottom wall 182. In one embodiment, wherein the body portion includes two annular lip portions, including a first annular lip portion integral with and projecting from a first end face of the body portion and a second annular lip portion integral with and projecting from a second end face of the body portion, the method includes forming a first opening 156 in a first panel 152 and a second opening 157 in a second panel 153, inserting the first lip portion through the first opening 156 in the first panel 152, and inserting a second lip portion through the second opening 157 in the second panel 153, and then deforming and clinching the lip portions over the panel, which may be done simultaneously.

As will be understood by those skilled in this art, various modifications may be made to the clinch element and method and apparatus for attaching a clinch element to a panel or panels as disclosed above within the purview of the appended claims. For example, the shape of the annular flange or body portion 26, 122 and the annular barrel portion 36, 136 may be modified as required by the particular application, particularly the shape of the outer surface 34, 134 of the annular flange or body portion 26, 122 and the shape of the outer surface 60, 160 of the barrel portion 36, 136. Although the application of the clinch element described above typically does not require anti-rotation means, radial ribs or other anti-rotation means may also be utilized as disclosed in the above-referenced related applications. The disclosed embodiments of the clinch elements 20, 120 may be formed of any suitable material depending upon the application. As specifically set forth above, an object of this invention to provide a method of attaching a clinch element or other element of this type to a panel, particularly including a metal panel, wherein the clinch element is rigidly and permanently attached to the panel having excellent push-off strength. Thus, the method of attaching a clinch spacer to a panel of this invention has achieved the objectives set forth above.

Having described one preferred embodiment of a method of attaching a clinch spacer to a panel of this invention, the method of this invention is now claimed as follows.

The invention claimed is:

1. A clinch element for clinching attachment to a panel, comprising:
    a body portion including an axial bore;
    a barrel portion coaxial with said body portion and said axial bore;
    an annular flange portion having a first end face proximate to said barrel portion, said barrel portion extending from said first end face to an annular planar surface defined proximate a barrel end; and
    an annular lip portion projecting from said annular planar surface, said annular lip portion circumferentially defined about said barrel portion and proximate said barrel end, said annular lip portion including an arcuate free end portion having a diameter smaller than an outer diameter of said annular flange portion and greater than an outer diameter of said barrel portion, a frustoconical inner surface proximate said arcuate free end portion and said annular planar surface surrounding said bore and extending generally perpendicular to an axis of said bore from said bore to said annular lip portion.

2. The clinch element as defined in claim 1, wherein said annular lip portion includes a generally frustoconical outer surface blending into said arcuate free end portion.

3. The clinch element as defined in claim 1, wherein said body portion includes:
    a second barrel portion coaxial with said body portion and said axial bore;
    a second end face of said annular flange portion proximate to said second barrel portion, said second barrel portion extending from said second end face to a second annular planar surface defined proximate a second barrel end; and
    a second annular lip portion projecting from said second annular planar surface, said second annular lip portion circumferentially defined about said second barrel portion and proximate said second barrel end, said second annular lip portion including a second arcuate free end portion having a diameter smaller than said outer diameter of said annular flange portion and greater than an outer diameter of said second barrel portion, a second frustoconical inner surface proximate said second arcuate free end portion and said second annular planar surface surrounding said bore and extending generally perpendicular to said axis of said bore from said bore to said second annular lip portion.

4. A method of attaching a clinch element to a panel, comprising the following steps:
    forming a clinch element including:
        a body portion having an axial bore;
        a barrel portion coaxial with said body portion and said axial bore;
        an annular flange portion having a first end face proximate to said barrel portion, said barrel portion extending from said first end face to an annular planar surface defined proximate a barrel end;
        an annular lip portion projecting from said annular planar surface, said annular lip portion circumferentially defined about said barrel portion and proximate said barrel end, said annular lip portion including an arcuate free end portion having a diameter smaller than an outer diameter of said annular flange portion and greater than an outer diameter of said barrel portion, a frustoconical inner surface proximate said arcuate free end portion and said annular planar surface surrounding said bore and extending generally perpendicular to an axis of said bore from said bore to said annular lip portion;
    forming an opening through a panel having an inside diameter less than said outer diameter of said annular flange portion, and greater than an outer diameter of said arcuate free end portion; and
    driving said arcuate free end of said annular lip portion against a bottom wall of an annular die cavity having an outwardly chamfered inner side wall deforming said arcuate free end of said annular lip portion radially outwardly and a generally planar bottom wall deforming said annular lip portion against said panel forming a secure installation.

5. The method as defined in claim 4, wherein said die member includes a cylindrical projecting piloting point having an outside diameter less than an inside diameter of said bore through said body portion and said annular lip portion and said annular die cavity surrounding said projecting piloting point, said method including inserting said piloting point in said bore of said annular lip portion.

6. The method as defined in claim 4, wherein said body portion of said clinch element includes:
    a second barrel portion coaxial with said body portion and said axial bore;
    a second end face of said annular flange portion proximate to said second barrel portion, said second barrel portion extending from said second end face to a second annular planar surface defined proximate a second barrel end; and
    a second annular lip portion projecting from said second annular planar surface, said second annular lip portion circumferentially defined about said second barrel portion and proximate said second barrel end, said second annular lip portion including a second arcuate free end portion having a diameter smaller than said outer diameter of said annular flange portion and greater than an outer diameter of said second barrel portion, a second frustoconical inner surface proximate said second arcuate free end portion and said second annular planar surface surrounding said bore and extending generally perpendicular to said axis of said bore from said bore to said second annular lip portion;
    said method including forming a first opening in a first panel and forming a second opening in a second panel, inserting said annular lip portion through said first opening in said panel, inserting said second lip portion through said second opening in said second panel, then driving a free end of said annular lip portion against a bottom wall of an annular die cavity of a first die member having an outwardly chamfered inner side wall deforming said arcuate free end of said annular lip portion radially outwardly and a generally planar bottom wall securing said annular lip portion to said first panel, and driving said second annular lip portion against a bottom wall of a second annular die cavity having an outwardly chamfered inner side wall, deforming a free end of said second annular lip portion radially outwardly and securing said second annular lip to said second panel.

7. The method as defined in claim 6, wherein said annular lip portion is driven into said annular die cavity of said first die member and said second annular lip portion is driven into said die cavity of said second die member simultaneously.

8. The method as defined in claim 6, wherein said first and second die members each include a projecting generally cylindrical piloting point having a flat end and a die cavity surrounding the piloting point, said method including first axially aligning said first and second die members, axially aligning said clinch element and the openings through said first and second panels, then driving at least one of said die members toward the other of said die members until the flat ends of the projecting piloting points contact.

* * * * *